United States Patent Office 3,361,731
Patented Jan. 2, 1968

3,361,731
METHOD OF POLYMERIZING MONOOLEFINICALLY UNSATURATED COMPOUNDS USING ALUMINUM OXYHALIDE AS CATALYST
Junji Furukawa and Takeo Saegusa, Kyoto, and Hirosuke Imai, Takatsuki, Japan, assignors to Nippon Oil Company, Limited, Tokyo, Japan, a corporation of Japan
No Drawing. Filed Aug. 14, 1964, Ser. No. 389,796
Claims priority, application Japan, Aug. 19, 1963, 38/44,250
8 Claims. (Cl. 260—91.1)

This invention relates to a method of polymerizing monoolefinically unsaturated compounds using a novel catalyst.

It has been known heretofore that Friedel-Crafts type catalysts, such as aluminum chloride, boron trifluoride, titanium tetrachloride and tin tetrachloride, are effective as cationic polymerization catalyst for the polymerization of monoolefinically unsaturated compounds, such as styrene, alpha-methylstyrene, isobutylene and various vinyl ethers. However, for the production of polymers of high polymerization degree using such catalyst, polymerization conditions have to be strictly limited. Particularly, the structure of polymers produced by using such catalyst is influenced largely by the polymerization temperature and for the production of polymers of high polymerization degree the polymerization must be carried out at low temperatures.

The inventors have made extensive studies to overcome the above disadvantages of heretofore known polymerization processes and have now accomplished a novel method of producing polymers of high polymerization degree from monoolefinically unsaturated compounds. The novel polymerization method of the invention is based on the inventors' discovery that when a monoolefinically unsaturated compound is polymerized using as the polymerization catalyst non-volatile residue obtained by thermal decomposition of an aluminum halide etherate or a combination of such non-volatile residue and a co-catalyst hereinafter described, polymers having high polymerization degree and excellent physical properties can easily be obtained.

Catalyst used in the method of the invention is non-volatile residue obtained by the thermal decomposition of an aluminum halide etherate. The thermal decomposition reaction of aluminum halide etherate is considered to proceed according to the following formula:

$$AlX_3 \cdot R_2O \rightarrow AlOX + 2RX$$

In the above formula, X is a halogen atom, such as fluorine, chlorine, bromine or iodine and R is an aliphatic or aromatic hydrocarbon radical. In this thermal decomposition reaction, alkyl or aryl halide RX is liberated and removed from the reaction system as volatile matter and the non-volatile residue which remains after completion of the reaction consists essentially of a compound AlOX. Surprisingly, the inventors have found that the non-volatile residue thus obtained has considerably higher catalytic activity than the original aluminum halide etherate.

The thermal decomposition reaction of aluminum halide etherate does not always proceed exactly as shown in the above formula and sometimes there may remain relatively small amounts of aluminum halide, alumina and aluminum alkoxide in the non-volatile residue in addition to the compound AlOX. Such non-volatile residue is also useful as catalyst in the method of the invention and the catalyst of the invention is not limited to the single pure compound AlOX.

Aluminum halide, etherates which may be used for the preparation of the catalyst of the invention may be represented by the following general formula:

$$AlX_3(R_2O)_n$$

In the above formula, X is a halogen atom, such as fluorine, chlorine, bromine or iodine, R is an aliphatic or aromatic hydrocarbon radical and $n$ is an integer equal to or greater than 1.

The thermal decomposition of aluminum halide etherate is carried out at a temperature from 50° C. to 500° C., preferably at a temperature from 100° C. to 300° C. The reaction may be carried out without solvent or in the presence of a suitable solvent. The non-volatile residue obtained by the reaction may be used without further treatment or it may be purified by washing with a suitable solvent, such as alkyl halide or hydrocarbon, to remove soluble matters before use.

Non-volatile thermal decomposition residue thus obtained may be used as the polymerization catalyst, in itself alone. But its catalytic activity can be greatly enhanced by using the non-volatile thermal decomposition residue in combination with a suitable co-catalyst. Generally, suitable co-catalysts are such compounds which liberate carbonium or oxonium ion on reaction with a Lewis acid.

A list of examples of compounds which may be used as the co-catalyst is given below.

(1) Compounds which liberate carbonium ion on reaction with a Lewis acid:

(a) alpha-haloalkyl ether, such as monochlorodimethyl ether, 2,3-dichlorotetrahydrofuran, etc.
(b) acid anhydride, acid chloride and acid ester, such as acetic anhydride, acetyl chloride, benzoyl chloride, etc.
(c) strong acid salt, such as dialkyl sulfate, aryl sulfonate, etc.
(d) alkyl halide and aryl halide, such as t-butyl chloride, benzyl chloride, benzotrichloride, etc.

(2) Compounds which liberate oxonium ion on reaction with a Lewis acid:

(a) alkylene oxide, such as epichlorohydrin, epibromohydrin, epifluorohydrin, epiiodohydrin, ethylene oxide, propylene oxide, styrene oxide, butadiene monoxide, 2,3-epoxybutane, etc.
(b) trimethylene oxide and derivatives thereof, such as 3,3-bis(chloromethyl)oxacyclobutane, etc.
(c) beta-propiolactone and derivatives thereof
(d) ketene, diketene and derivatives thereof
(e) azo and diazo compounds, such as diazomethane Either a single compound or a mixture of above described compounds may be used as co-catalyst in the catalyst system of present invention.

Monoolefinically unsaturated compounds which may be polymerized by the method of the invention may be represented by the following general formula.

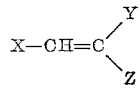

In the above formula, X, Y and Z are same or different radicals selected from the group consisting of hydrogen, alkyl such as methyl, ethyl, n-propyl, isopropyl, n-butyl, isobutyl, sec-butyl, tert-butyl, aryl, such as phenyl, alkoxy such as methoxy, ethoxy, n-propoxy, isopropoxy, n-butoxy, isobutoxy, sec-butoxy, tert-butoxy, and aryloxy such as phenoxy radicals.

Examples of monoolefinically unsaturated compounds which may be polymerized by the method of the invention are styrene, various nuclear substituted styrenes, alpha-alkylstyrene such as alpha-methylstyrene, vinyl ether, isobutylene, 1,1-diethyl ethylene, 1-ethyl-1-methyl ethylene and similar cationically polymerizable monoolefinically unsaturated compounds.

Catalyst system of the invention is active for the polymerization of a single monoolefinically unsaturated compound as well as for the polymerization of a mixture of two or more monoolefinically unsaturated compounds. In the latter case the product may be a copolymer or a mixture of homopolymers.

As catalyst, the non-volatile thermal decomposition residue of aluminum halide etherate may be used in a proportion of $1 \times 10^{-5}$ gram atom to 1 gram atom calculated as aluminum for 1 mol of monomer to be polymerized. Preferable proportion is from $1 \times 10^{-4}$ gram atom to $1 \times 10^{-1}$ gram atom calculated as aluminum for 1 mol of monomer to be polymerized. Co-catalyst is used generally in a proportion of from $1 \times 10^{-5}$ mol to $1 \times 10^{-1}$ mol for 1 mol of monomer.

Polymerization may be effected by bulk polymerization and solution polymerization technique and as the polymerization temperature a temperature of from $-200°$ C. to $150°$ C. may be used. In the case of solution polymerization, organic solvent which does not act adversely on the polymerization reaction may be used. Examples of such organic solvents are aliphatic hydrocarbon, aromatic hydrocarbon, alkyl halide and aryl halide.

For a better understanding of the invention, polymerization of monoolefinically unsaturated compounds using the novel catalyst system of present invention will be set forth below. It will be understood that these examples are for the purpose of illustration, but not limitative of the invention.

EXAMPLE 1

50 ml. of an ether solution of $AlCl_3 \cdot Et_2O$ (0.5 mol/lit.) were placed in a conical flask which has been purged with nitrogen. Ether was distilled off by stirring and then the flask was heated on an oil bath to a temperature of $160°$ C. When the temperature of the bath reached $160°$ C. thermal decomposition of the aluminum chloride diethyl etherate with violent evolution of ethyl chloride began. Heating was continued for 3 hours until the thermal decomposition was completed. Yellowish brown solid was obtained as the residue. The residue was pulverized, heated to $160°$ C. under reduced pressure and then suspended in methylene chloride.

0.05 mol of styrene and 35 ml. of methylene chloride were placed in a test tube which has been purged with nitrogen. The mixture was cooled to $0°$ C. and 5 ml. of catalyst suspension (0.5 gram atom of aluminum per liter) prepared as described above were added to the mixture. The test tube was then sealed and polymerization was allowed to proceed at $0°$ C. for one day.

After completion of the polymerization reaction the reaction mixture was poured into methanol acidified with hydrochloric acid and the polymer was separated by filtration. White, resinous polymer having high polymerization degree was obtained in a quantitative yield.

EXAMPLE 2

0.05 mol of styrene, 35 ml. of methylene chloride and 0.0005 mol of t-butyl chloride were placed in a test tube which has been purged with nitrogen. The mixture was cooled to $-75°$ C. and catalyst suspension (of an amount corresponding to 0.0005 gram atom of aluminum) prepared as described in Example 1 was added. The mixture then stood for 24 hours for polymerization. White, resinous polymer having high polymerization degree was obtained in a yield of 77.2%.

EXAMPLE 3

0.05 mol of alpha-methylstyrene and 35 ml. of methylene chloride were placed in a test tube which has been purged with nitrogen and the mixture was cooled to $-75°$ C. Catalyst suspension prepared as described in Example 1 was added to the mixture in an amount corresponding to 0.0005 gram atom of aluminum. The test tube was then sealed and stood for 24 hours for polymerization. White, resinous polymer was obtained in a quantitative yield.

EXAMPLE 4

0.05 mol of isobutyl vinyl ether, 35 ml. of methylene chloride and 0.0005 mol of t-butyl chloride were placed in a test tube which has been purged with nitrogen and the mixture was cooled to $-78°$ C. Catalyst suspension prepared as described in Example 1 of an amount corresponding to 0.0005 gram atom of aluminum was added to the mixture. The test tube was then sealed and stood for 24 hours for polymerization. Non-crystalline polymer having high polymerization degree was obtained in a yield of 99.1%.

EXAMPLE 5

100 ml. of methylene chloride and 0.005 mol of t-butyl chloride were placed in a test tube which has been purged with nitrogen. The mixture was cooled to $-78°$ C. and catalyst suspension prepared as described in Example 1 of an amount corresponding to 0.005 gram atom of aluminum was added to the mixture. 0.25 mol of purified butylene was blown into the mixture under violent agitation. One hour after the completion of the addition of butylene, the reaction mixture was poured into methanol acidified with hydrochloric acid. The polymer formed was separated by filtration and dried under reduced pressure. White, rubbery product was obtained in a yield of 54.6%.

EXAMPLE 6

0.025 mol of isobutyl vinyl ether, 35 ml. of toluene and 0.000125 mol of t-butyl chloride were placed in a test tube filled with nitrogen and the mixture was cooled to $-78°$ C. Toluene suspension of catalyst prepared as described in Example 1 of an amount corresponding to 0.000125 gram atom of aluminum was added to the mixture. The test tube was then sealed and stood for 24 hours for polymerization. White, non-sticking, hard polymer was obtained in a yield of 8.40%.

EXAMPLE 7

Same procedure as described in Example 6 was repeated except that t-butyl chloride was eliminated. Polymer obtained was substantially same with that obtained in Example 6, but the yield of the polymer was reduced to 4.62%.

What we claim is:

1. A method of polymerizing monoolefinically unsaturated compounds which comprises polymerizing a monoolefinically unsaturated compound of the following general formula:

wherein X, Y and Z are radicals selected from the group consisting of hydrogen, alkyl, aryl, alkoxy and aryloxy radicals at a temperature of from $-200°$ C. to $150°$ C., by using a catalyst system consisting of aluminum oxyhalide prepared by the thermal decomposition of aluminum halide etherate, said catalyst system being employed in a content of from $1 \times 10^{-5}$ gram atom to 1 gram atom calculated as aluminum for 1 mol of monomer.

2. A method according to claim 1 wherein the polymerization is carried out in the presence of an inert solvent.

3. A process according to claim 2 wherein the solvent is methylene chloride.

4. A method according to claim 1 wherein the monoolefinically unsaturated compound is styrene.

5. A method according to claim 1 wherein the monoolefinically unsaturated compound is alphamethylstyrene.

6. A method according to claim 1 wherein the monoolefinically unsaturated compound is isobutylene.

7. A method according to claim 1 wherein the monoolefinically unsaturated compound is isobutyl vinyl ether.

8. A method of polymerizing monoolefinically unsaturated compounds which comprises polymerizing a monoolefinically unsaturated compound of the following general formula:

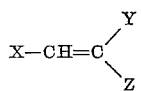

wherein X, Y and Z are radicals selected from the group consisting of hydrogen, alkyl, aryl, alkoxy and aryloxy radicals by using a catalyst system of aluminum oxyhalide prepared by the thermal decomposition of aluminum halide etherate, said catalyst system being employed in a content of from $1 \times 10^{-5}$ gram atom to 1 gram atom calculated as aluminum for 1 mole of monomer and a compound selected from the group consisting of monochlorodimethyl ether, tert, butyl chloride, benzyl chloride and acetyl chloride as a co-catalyst component, said co-catalyst component being employed in a content of from $1 \times 10^{-5}$ mol to $1 \times 10^{-1}$ mol for 1 mol of monomer.

References Cited
UNITED STATES PATENTS

| | | | |
|---|---|---|---|
| 2,734,047 | 2/1956 | Smith et al. | 260—94.8 |
| 3,252,955 | 5/1966 | Calfee | 260—94.8 |

FOREIGN PATENTS 463,728  3/1950  Canada.

JOSEPH L. SCHOFER, *Primary Examiner.*

H. WONG, *Assistant Examiner.*